Sept. 29, 1931.    W. M. SHEEHAN ET AL    1,825,480
LOCOMOTIVE DRIVING WHEEL STRUCTURE
Filed Jan. 23, 1931    2 Sheets-Sheet 1
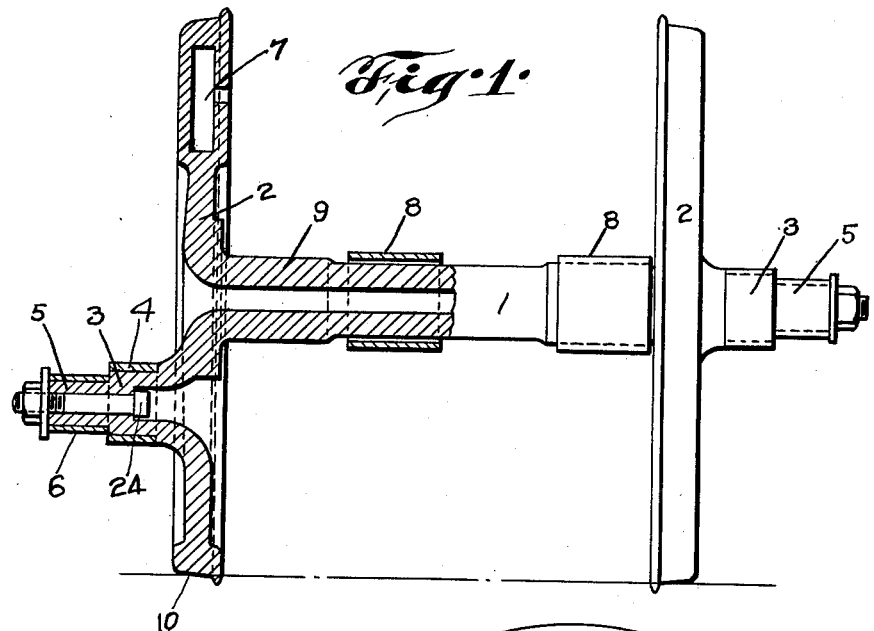
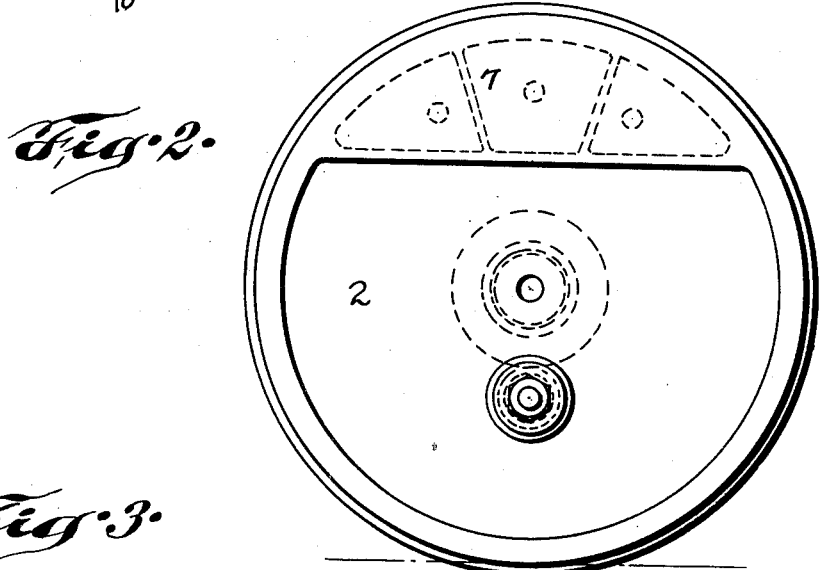
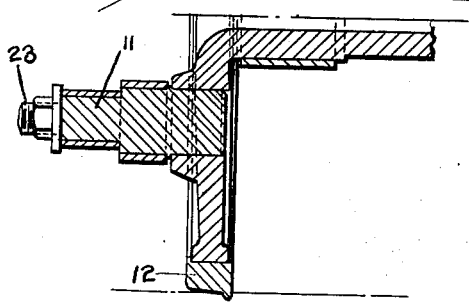
Inventors
William M. Sheehan
Harry M. Pflager
By Rodney Bedell
Attorney Sept. 29, 1931.  W. M. SHEEHAN ET AL  1,825,480
LOCOMOTIVE DRIVING WHEEL STRUCTURE
Filed Jan. 23, 1931  2 Sheets-Sheet 2
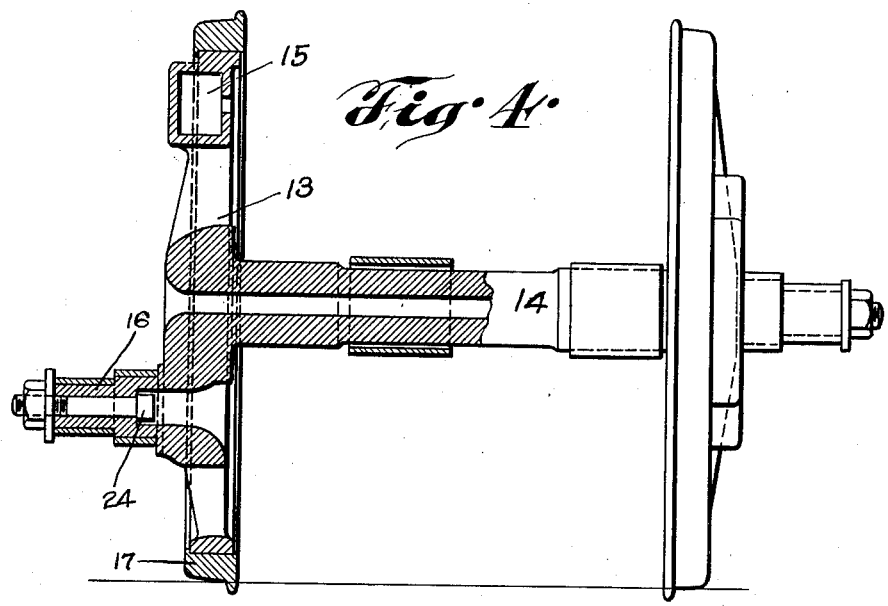
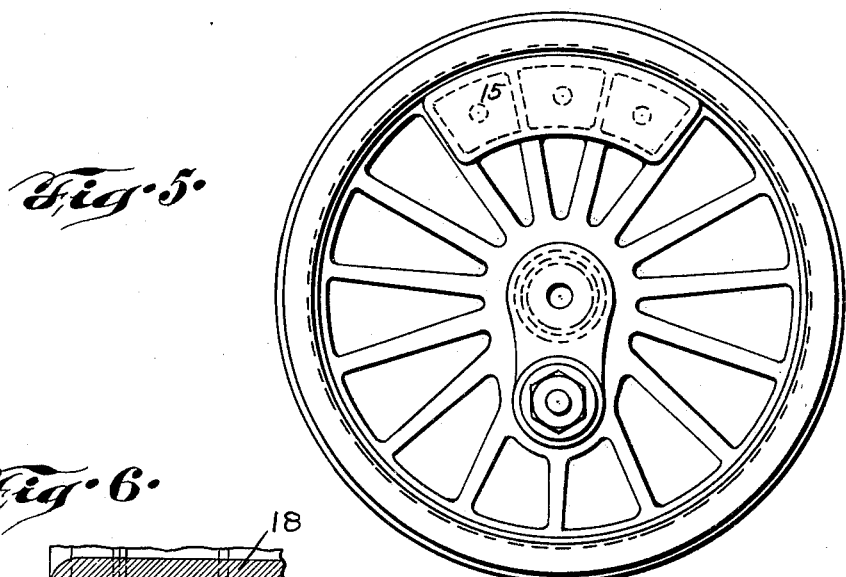
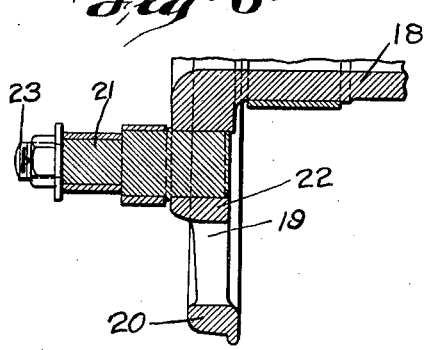
Inventors
William M. Sheehan
Harry M. Pflager
By Rodney Bedell
Attorney Patented Sept. 29, 1931

1,825,480

UNITED STATES PATENT OFFICE

WILLIAM M. SHEEHAN, OF MERION, PENNSYLVANIA, AND HARRY M. PFLAGER, OF ST. LOUIS, MISSOURI, ASSIGNORS TO GENERAL STEEL CASTINGS CORPORATION, OF GRANITE CITY, ILLINOIS, A CORPORATION OF DELAWARE

LOCOMOTIVE DRIVING WHEEL STRUCTURE

Application filed January 23, 1931. Serial No. 510,826.

Our invention relates to railway rolling stock and consists in a novel locomotive driving wheel and axle structure.

One object of our invention is to provide separate bushings of suitable bearing metal for the journal and crank pin where the axle, wheel, and pin are cast integral, so that the whole casting need not be made of this relatively expensive metal and so that the main body of wheels and axle can be made of a metal having the necessary characteristics to withstand the forces applied to the wheels and axle.

Another object of our invention is to provide a driver with various parts cast integral therewith, thus cutting down the weight and bulk of the driver without decreasing its strength.

These and other objects are attained in the structure illustrated in the following drawings in which—

Figure 1 is in part a longitudinal elevation and in part a vertical longitudinal section of an axle and wheel assembly comprising one embodiment of our invention.

Figure 2 is an outside elevation of a driver.

Figure 3 is a vertical transverse section through a part of a driver, crank pin, and axle showing another form of our invention.

Figure 4 illustrates a modification of the structure shown in Figure 1, and shows wheels having spokes and separate tires.

Figure 5 is an outside elevation of the driver wheel and crank pin included in the modification shown in Figure 4.

Figure 6 is a vertical transverse section through a part of the driver and axle and the crank pin in another modification.

In the structure shown in Figures 1 and 2, a hollow axle 1 is cast integral with wheel center 2, counter balance lugs or pockets 7, and a crank pin comprising inner part 3 adapted to seat the side rod and outer part 5 adapted to seat the connecting rod. Bushings 4 and 6, machined and pressed onto the respective portions of the crank pin, provide bearing surfaces to receive the rods. The side and connecting rods are held in operative connection with the crank pin by a bolt, washer, and nut as shown in Figures 1 and 4. Journal bearing bushings 8 are seated in cores around the axle portion of the mold with sufficient core material between the bushing and axle forming walls of the mold so that when the sand is cleared away after cooling, the bushings will be loose cylindrical rings around the axle. The enlarged portions 9 of the axle are then machined to proper size and the bushings 8 pressed onto them. In the embodiment under consideration, the tire 10 is shown cast integral with the wheel center.

In Figure 3, the crank pin 11 is shown cast separately and pressed into a hole in the cast wheel center. The tire 12 is shown cast separately and shrunk onto the wheel center.

Figure 4 shows spoked driving wheel center 13 integral with axle 14, counter balance pockets 15, and crank pin 16. The tire 17 is shown cast separately and shrunk into place on the rim of the wheel center.

Figure 6 shows axle 18, wheel center 19, and tire 20 cast integral and crank pin 21 formed separately and pressed into a hole in the driver hub 22. Where the crank pin is formed separately, extensions 23 are threaded (Figures 3 and 6) and replace the bolt 24 in Figures 1 and 4.

Obviously, other modifications and combinations of the various elements may be included within the spirit of our invention and we contemplate the exclusive use of all such variations as come within the scope of our claims.

We claim:

1. A railway locomotive driving wheel center with axle, crank pin, counter balance, and tire integral therewith.

2. In combination, a locomotive driving wheel center, crank pin, and axle cast integral and a separately formed journal bearing within which said axle is cast, said crank pin having separately formed bearing surfaces for journaling the side rod and connecting rod.

3. In combination, a pair of locomotive driving wheels integral with their axle, and separately formed integral journal forming bushing elements of different metal surrounding said axle.

4. In combination, a pair of locomotive driving wheel centers and axle formed integral, and a journal bushing element within which said axle is cast, said axle having an enlarged end portion upon which said bushing may be pressed.

5. In combination, a locomotive driving wheel center and axle cast integral and a one piece bearing forming bushing loosely surrounding the smaller portion of said axle and adapted to be pressed upon an enlarged end portion of said axle.

6. In combination, a locomotive driving wheel center and axle cast integral, and a one piece bearing forming bushing loosely surrounding the smaller portion of said axle and adapted to be pressed upon an enlarged end portion of said axle.

7. In combination, a locomotive driving wheel center, a tire, an axle, and a crank pin all cast integral with said center, and separately formed bearing bushings on said crank pin for reception of a side rod and a connecting rod.

8. In combination, a locomotive driving wheel center and axle cast integral, and a separately formed integral journal bearing surrounding said axle.

9. A locomotive driving wheel center, axle, and tire cast integral.

In testimony whereof we hereunto affix our signatures this 15th day of January, 1931.

WILLIAM M. SHEEHAN.
HARRY M. PFLAGER.